United States Patent [19]

Navascues

[11] Patent Number: 5,704,962
[45] Date of Patent: Jan. 6, 1998

[54] GRANULAR FERTILIZERS

[75] Inventor: Luc Navascues, Paris, France

[73] Assignee: Ceca S. A., Puteaux, France

[21] Appl. No.: 560,764

[22] Filed: Nov. 21, 1995

[30] Foreign Application Priority Data

Nov. 24, 1994 [FR] France .................. 94 14088

[51] Int. Cl.$^6$ .................................................. C05G 5/00
[52] U.S. Cl. ...................... 71/64.07; 71/64.11; 71/64.12; 71/64.13
[58] Field of Search .................. 71/64.07, 64.12, 71/64.11, 64.13

[56] References Cited

U.S. PATENT DOCUMENTS

| | | | |
|---|---|---|---|
| 2,702,747 | 2/1955 | Studebaker | 71/64 |
| 3,234,003 | 2/1966 | Sawyer et al. | 71/27 |
| 3,234,006 | 2/1966 | Sawyer et al. | 71/59 |
| 3,250,607 | 5/1966 | Sawyer et al. | 71/64 |
| 3,305,491 | 2/1967 | Oster | 252/384 |
| 3,926,841 | 12/1975 | Habasko et al. | 252/383 |
| 4,150,965 | 4/1979 | Van Hijfte et al. | 71/27 |
| 4,374,039 | 2/1983 | Schapira et al. | |
| 4,917,919 | 4/1990 | Geisler et al. | |
| 5,175,370 | 12/1992 | Fruth et al. | 564/493 |
| 5,231,228 | 7/1993 | Fruth et al. | 564/463 |
| 5,364,440 | 11/1994 | Schapira et al. | |
| 5,423,897 | 6/1995 | Hudson et al. | 71/28 |

FOREIGN PATENT DOCUMENTS

| | | |
|---|---|---|
| 0 389 331 A1 | 9/1990 | European Pat. Off. . |
| 0 574 306 A1 | 12/1993 | European Pat. Off. . |

*Primary Examiner*—Deborah Jones
*Assistant Examiner*—Amy M. Harding
*Attorney, Agent, or Firm*—Pennie & Edmonds

[57] ABSTRACT

Compositions for the treatment of granular fertilizers containing secondary $C_{14}$–$C_{20}$ dialkyl monoamines or their mixture with primary monoamines which are also $C_{14}$–$C_{20}$ have the advantage of limiting both the solidification and the secondary production of dust on storage. The process is particularly advantageous in the treatment of NPK-type fertilizers.

10 Claims, 1 Drawing Sheet

GRANULAR FERTILIZERS

FIELD OF THE INVENTION

The present invention relates to improvements in granular fertilizers. More particularly, the present invention provides granular fertilizers in which the particles are coated with a substance that reduces caking therein and/or reduces the formation of dust therein on storage.

BACKGROUND OF THE INVENTION

Granulated fertilizers have an unfortunate tendency to solidify, both in bulk and when packaged in bags. Among the various techniques for curbing these phenomena, one of the most common is the treatment by coating with pulverulent compositions, such as talc, chalk or clay powder, or by spraying in a mixer, on cold or hot fertilizers, molten compositions based on anticaking agents and containing, if appropriate, oils, waxes and inorganic powders. A great many anticaking agents have been experimented with, among which fatty amines, and more particularly stearylamine or the corresponding industrial products, tallow monoamine or hydrogenated tallow monoamine, have met with continual success.

Granulated fertilizers have another disadvantage, that of generating dust during their handling. This dust is attributed, in addition to the part which arises from the fertilizer which has escaped granulation, indeed sometimes even pulverulent products used as anticaking agents, to the abrasion or the loss of cohesion of the granules. It is a trivial mechanical formation process; it is known how to minimize it by treating the fertilizer with oily products which stick this dust onto the grains or with waxy coating agents which fulfil the same role, which also reduce the friction between the grains and thus their abrasion. The phenomenon which it is proposed to combat with the present invention is of an entirely different nature. It is not generally known to a person skilled in the art. It arises with ternary fertilizers anticaked with fatty primary amines, due to a poorly understood but real interaction between the fertilizer and the amine. It becomes more pronounced as the formula and the characteristics depart from those of simple ammonium nitrates. The dust formed under these conditions probably corresponds to the breaking of fragile secondary crystalline formations outside the main body of the grain, this process becoming more pronounced, it seems, as the fertilizer is subjected, at a moderate temperature, to exposure cycles in a successively moist and dry atmosphere. The fertilizer thus gives off dust on storage under apparently very paradoxical conditions: moist atmosphere, following a treatment carried out in part in order to settle the dust which it initially contained or which would be generated by mechanical action. An object of the present invention is to overcome this disadvantage.

The success of anticaking agents based on fatty primary amines explains the wealth of literature on this subject. Many fatty amines and many formulations of these amines have been studied.

Suitable anticaking activity has been recognized, essentially with saturated monoamines in which the chain length extends on average from $C_{14}$ to $C_{20}$, the distribution of the chains in the crude products or the intentionally prepared mixtures being not immaterial. See, for instance, French Patent 2,644,780.

Secondary dialkyl monoamines, when they were investigated as anticaking agents, secondarily as primary antidusting agents, did not prove to be sufficiently effective in comparison with the very commonly used stearylamine. See, for instance, French Patent 2,062,452.

SUMMARY OF THE INVENTION

It has now just been found that fatty secondary dialkylamines or mixtures of fatty secondary dialkylamines and fatty primary amines, with their alkyl chains mainly distributed between 14 and 20 carbons, have very acceptable anticaking properties but, in particular, that ternary fertilizers treated with these mixtures or anticaking compositions containing them only generated a very small amount of secondary dust on storage.

Therefore the present invention provides compositions of matter that comprise granular fertilizers in which a substantial number, preferably substantially all, of the granules are coated with a secondary dialkyl monoamine. In the compositions of matter of the invention, the coating of the granules may further comprise up to 75 weight-% primary monoamine, and one or more members selected from the group consisting of oils, waxes, inorganic powders, and anionic surfactants. The fertilizer of the invention may be, for instance, an otherwise conventional ternary inorganic fertilizer comprising nitrogen, phosphorus, and potassium.

The present invention also provides methods for limiting both the tendency towards caking and the tendency towards giving off dust on storage in granular fertilizers. The method of the invention comprises coating the fertilizer granules with a coating as described herein.

DESCRIPTION OF THE PREFERRED EMBODIMENTS

Figure 1:
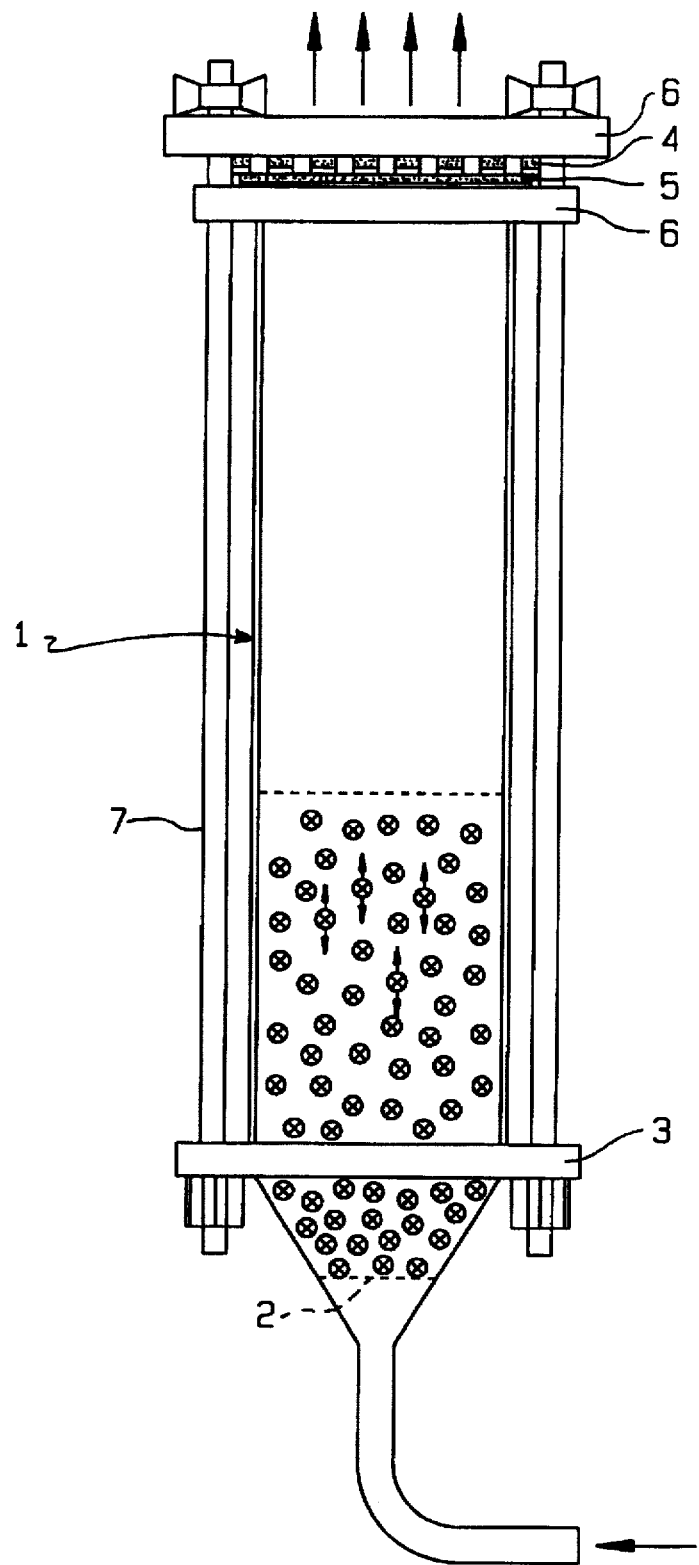
FIG. 1 illustrates equipment suitable for determining the level of dust in granular fertilizers.

The compositions used as means of the invention contain secondary $C_{14}$–$C_{20}$ dialkyl monoamines or mixtures of such secondary dialkyl monoamines with primary monoamines which are also $C_{14}$–$C_{20}$. The percentage by weight of primary amines in these mixtures can reach 75%. The content by weight of secondary and primary monoamines in the composition itself generally lies between 5% and 100%. Other, optional, ingredients of the anticaking composition are well known to the person skilled in the art. They include oils, waxes, inorganic powders, and anionic surfactants, preferably $C_{14}$–$C_{20}$ fatty acids, more preferably hydrogenated tallow fatty acid. European Application EP-A-0,389,331, the disclosure of which is expressly incorporated by reference herein, is indicative of the state of the art relative to coatings for granular fertilizers.

The compositions according to the invention are generally pasty at room temperature. They are applied after a moderate heating (approximately 60°–90° C.) which brings them to the liquid state with a sufficiently low viscosity (approximately 10 to 20 mpa·s) for it to be possible to spray them. Coating of the fertilizer is carried out according to the techniques which are well known to a person skilled in the art, preferably by spraying in a mixer. The working proportions of the amine mixtures according to the invention are between 0.1 and 1 kg per ton of fertilizer.

The invention applies to granulated fertilizers which generate dust by the effect of a treatment with a fatty amine and in particular to multinutrient fertilizers which contain at least two of the three essential fertilizing elements, nitrogen (N), phosphorus, expressed as phosphorus pentoxide ($P_2O_5$), and potassium, expressed as potassium oxide ($K_2O$). Conventional ternary (NPK) fertilizers such as 15-15-15, 17-17-17, or 13-13-21 or "V" formulae, such as 22-2-12, 14-8-22 or 15-7-24, or binary (NP) fertilizers, such as 15-30, are also capable of being treated according to the invention.

EXAMPLES

The examples which follow, which are not limiting, will make the invention better understood.

The caking of the fertilizer may thereby assessed according to a laboratory test method which consists in conditioning the fertilizer granules at their critical relative humidity for variable periods of time, and then forming cylindrical test specimens thereof by static compression and measuring the level of cohesion thereof corresponding to a given bulk density. The test is described in European Patent Application EP-A-0,389,331, the disclosure of which is expressly incorporated by reference.

The dust contained in a granulated fertilizer was thereby quantitatively determined according to the following test. The fertilizer grains are placed in a glass column and are there subjected to a rising air stream. The dust entrained by the gas flow is retained on a filter paper, which is weighed before and after blowing. Typical equipment, illustrated in FIG. 1, consists of a glass cylinder 1, which cylinder has a height of 30 cm and an internal diameter of 9 cm, fitted onto a conical base equipped with a grid 2 and terminating in an entry nozzle for compressed air and capped by a perforated disc 4 carrying a disc of filter paper 5, the entire unit being held together by flanges 3 and 6 by means of screw rods with wing nuts 7. The system is fed with compressed air at 8. The sample taken is 100 grams. The filter paper is of ash-free ultrafast filtration quality. The dry air flow rate is adjusted with a manometer so as to obtain fluidization of the fertilizer bed over a height of approximately 10 cm. The blowing time is 4 minutes. The level of dust is expressed in mg/100 g of fertilizer by the difference in weight of the filter before and after blowing. In general, two determinations are made and the mean is taken. In the other case, a third determination is made in order to obtain a better mean. Experience of the test and of its correspondence with spreading of dust over the ground leads to the rejection of fertilizers which give more than 50 mg of dust per 100 grams of granules. The tendency of the fertilizer to give off dust on storage is demonstrated by applying this measurement to granules exposed at rest to a sufficiently moist and warm atmosphere.

Example 1

An NPK 17-17-17 granulated fertilizer was treated with 20% by weight solutions of amines in an oil (Prorex® RPO from Mobil). The caking and dust results appear in the table below. The amines are Noram® SH from Ceca S.A., a hydrogenated tallow primary monoamine, Noram® 2SH from Ceca S.A., a hydrogenated tallow secondary monoamine (respectively referred to under the abbreviations NSH and N2SH in the table below), or a 50/50 mixture of the above two. These amines are compounds which can be represented respectively by the formulae RNH$_2$ and R$_2$NH, the R chain being a hydrogenated tallow saturated alkyl chain having 30% of C$_{16}$, and 65% of C$_{18}$. The proportions indicated are given in kilos of oily composition per ton of fertilizer.

The caking results are expressed in percentage of protection with respect to the control, for a fertilizer conditioned at 78% relative humidity, at 20° C., under static compression of 7.5 bar for 16 hours.

The dust results are expressed in mg of dust per 100 g of fertilizer, in (1) on the fertilizer as is and in (2) on the fertilizer after holding at 50° C. and at 50% relative humidity for 30 minutes. It should be noted that the experimental conditions (2) have a very pronounced effect on increasing the secondary production of dust by the fertilizer.

|  | Non-coated control | Fertilizer coated with: | | | | | |
|---|---|---|---|---|---|---|---|
|  |  | NSH | NSH | N2SH | N2SH | NSH/ N2SH | NSH/ N2SH |
| Proportion kg/t |  | 0.75 | 1.5 | 0.75 | 1.5 | 0.75 | 1.5 |
| Caking (prot %) | 0 | 70 | 75 | 55 | 75 | 75 | 80 |
| Dust (1) | 25 | 5 | 10 | 0 | 5 | 0 | 5 |
| Dust (2) | 80 | 160 | 200 | 30 | 35 | 40 | 45 |

Comparative Example 1'

The effect of the conventional composition based on stearylamine is here compared with that of a composition based on another monoamine, isotridecylamine (ITDA), which the literature teaches to be effective in preventing solidification of the fertilizer and the formation of dust.

Again, the dust results are expressed in mg of dust per 100 g of fertilizer, in (1) on the fertilizer as is and in (2) on the fertilizer after holding at 50° C. and at 50% relative humidity for 30 minutes.

|  |  | Fertilizer coated with: | | | |
|---|---|---|---|---|---|
|  | Control | NSH | NSH | ITDA | ITDA |
| Proportion kg/t | — | 0.75 | 1.5 | 0.75 | 1.5 |
| Caking (prot %) | 0 | 70 | 75 | 70 | 75 |
| Dust (1) | 25 | 5 | 10 | 5 | 10 |
| Dust (2) | 80 | 160 | 200 | 150 | 180 |

The test confirms that amines said to be effective in keeping the fertilizer grains free and in settling the dust thereof are not necessarily remedies for the formation of secondary dust; in the case of the example, they even make a considerable contribution to its development.

Example 2

A reference composition C1, based on primary amine comprising 10% primary monoamine, 5% of hydrogenated tallow fatty acid, 5% of paraffin wax and 80% of oil (Mobil Prorex RPO), and a composition C2 according to the invention, comprising 5% of hydrogenated tallow primary monoamine, 5% of hydrogenated tallow secondary dialkyl monoamine, 5% of hydrogenated tallow fatty acid, 5% of paraffin wax and 80% of oil (Mobil Prorex RPO), are applied to various granulated fertilizers, the amines being the same as those in Example 1. The proportions used were 1.5 kg of the compositions C1 or C2 per ton of fertilizer. The caking and dust test results obtained on treated fertilizers, both in the laboratory and in the factory, are combined in the table below. In the laboratory, coating is carried out in the laboratory coating drum and the dust is determined 24 hours after the coating after conditioning the fertilizer for 30 minutes at 50*C in an environmental chamber with a humidity controlled at 50% relative humidity. In the factory, the coating is carried out in an industrial drum and the dust is determined on receiving the fertilizer in the laboratory and on the fertilizer after storage on site for two months. The following results are obtained:

| NPK Fertilizers | Anticaking (% of protection) | | Dust (mg/100 g) | |
|---|---|---|---|---|
| | C1 | C2 | C1 | C2 |
| Laboratory tests | | | | |
| 15.15.15 | 65 | 60 | 60 | 10 |
| 15.07.24 | 50 | 50 | 170 | 50 |
| 18.06.5 | 60 | 65 | 80 | 50 |
| Industrial tests | | | | |
| 13.13.21 | 90 | 90 | 20 / 35[1] | 0 / 5[1] |
| 8.24.16 | 90 | 90 | 20 / 60[1] | 15 / 30[1] |
| 18.6.5 | 70 | 70 | 30 / 150[1] | 15 / 30[1] |

[1]Dust test carried out on fertilizer aged 2 months

Although this invention has been described with reference to specific embodiments thereof, such reference is for illustrative purposes only, and the scope of the invention patented is to be determined by reference to the appended claims.

What is claimed is:

1. A granular ternary inorganic fertilizer comprising granules which are coated with a composition comprising secondary dialkyl monoamines and primary monoamines, wherein the composition comprises less than or equal to 75% by weight primary monoamines.

2. The granular fertilizer of claim 1 wherein said secondary dialkyl monoamine has the formula $R_2NH$ wherein each R represents a $C_{14}$–$C_{20}$ alkyl chain.

3. The granular fertilizer of claim 2 wherein R represents a hydrogenated tallow moiety.

4. The granular fertilizer of claim 3 wherein R represents a hydrogenated tallow saturated alkyl chain wherein 30% of the alkyl moieties are $C_{16}$ and 65% of the alkyl moieties are $C_{18}$.

5. The granular fertilizer of claim 1 wherein the primary and secondary monoamines in the composition are present in an amount between 5% and 100%.

6. The granular fertilizer of claim 1 wherein the composition further comprises one or more members selected from the group consisting of oils, waxes, inorganic powders, and anionic surfactants.

7. The granular fertilizer of claim 6 wherein the composition contains one or more fatty acids as an anionic component.

8. The granular fertilizer of claim 7 wherein said fatty acids are hydrogenated tallow fatty acids.

9. A method for limiting both the tendency towards caking and the tendency towards giving off dust on storage in granular ternary inorganic fertilizers which comprises coating the fertilizer granules with a coating in accordance with claim 1.

10. The granular fertilizer of claim 1 wherein said fertilizer is a ternary inorganic fertilizer comprising nitrogen, phosphorous, and potassium.

* * * * *